United States Patent
Kato et al.

[11] Patent Number: 5,692,480
[45] Date of Patent: Dec. 2, 1997

[54] EVAPORATIVE EMISSION CONTROL SYSTEM FOR AUTOMOTIVE VEHICLE

[75] Inventors: Naoya Kato, Aichi-ken; Hideaki Itakura; Tohru Yoshinaga, both of Okazaki; Tokio Kohama, Nishio; Katuo Azegami, Toyokawa, all of Japan

[73] Assignee: Nippon Soken, Inc., Nishio, Japan

[21] Appl. No.: 698,454

[22] Filed: Aug. 16, 1996

[30] Foreign Application Priority Data

Sep. 4, 1995 [JP] Japan .................................. 7-251776

[51] Int. Cl.$^6$ .................................................. F02M 33/02
[52] U.S. Cl. .................................................. 123/519
[58] Field of Search .......................... 123/516, 518, 123/519; 137/587

[56] References Cited

U.S. PATENT DOCUMENTS

| | | | |
|---|---|---|---|
| 3,957,025 | 5/1976 | Heath et al. | 123/518 |
| 4,343,281 | 8/1982 | Uozumi et al. | 123/519 |
| 5,067,468 | 11/1991 | Otowa et al. | 123/516 |
| 5,099,880 | 3/1992 | Szlaga et al. | 137/587 |
| 5,174,265 | 12/1992 | Sekine | 123/516 |
| 5,193,511 | 3/1993 | Fujino | 123/516 |
| 5,211,151 | 5/1993 | Nakajima et al. | 123/516 |
| 5,456,238 | 10/1995 | Horiuchi et al. | 137/587 |

*Primary Examiner*—Thomas N. Moulis

[57] ABSTRACT

An evaporative emission control system which may be used in automotive vehicles is disclosed. The evaporative emission control system includes a canister, an inlet passage, a fuel vapor passage, an outlet valve, and an inlet valve. The air inlet passage is exposed at an end to the atmosphere and connected at the other end to the canister for drawing fresh air into the canister. The fuel vapor passage communicates between the canister and a fuel tank. When a pressure in the fuel tank is increased above a given level so that a difference in internal pressure between the fuel tank and the canister reaches a first value, the outlet valve establishes communication between the fuel tank and the canister to allow fuel vapor evaporated within the fuel tank to be drawn into the canister through the fuel vapor passage. Alternatively, when the pressure in the fuel tank is decreased below a given level so that a difference in internal pressure between the fuel tank and the canister reaches a second value, the inlet valve establishes communication between the fuel tank and the canister to allow the air to be drawn into the canister through the air inlet passage. The second value is so determined as to prevent the amount of fuel vapor generated within the fuel tank from being increased above a given value.

5 Claims, 5 Drawing Sheets

5,692,480

EVAPORATIVE EMISSION CONTROL SYSTEM FOR AUTOMOTIVE VEHICLE

BACKGROUND OF THE INVENTION

1. Technical Field

The present invention relates generally to a evaporative emission control system for an automotive vehicle designed to adsorb fuel vapor evaporated within a fuel tank for preventing the fuel vapor from escaping outside the vehicle.

2. Background of Related Art

Generally, fuel vapor generated in a fuel tank by a change in temperature during parking of a vehicle is purged by an evaporative emission control system with a canister filled with an absorbing substance. The canister is connected at an end to a fuel vapor passage leading to the fuel tank and at the other end to an air intake passage for drawing fresh air thereinto.

The fuel vapor passage has disposed therein a tank pressure-activated valve consisting of an inlet valve and an outlet valve which are designed to be opened when a pressure of 1 kPa to 2 kPa acts on the inlet valve. Specifically, when the internal pressure of the fuel tank is elevated by an increase in temperature of the fuel tank above a given level, the outlet valve is opened to discharge fuel vapor out of the fuel tank which are, in turn, collected or adsorbed in the caster. Alternatively, when the internal pressure of the fuel tank drops below a given level, the inlet valve is opened to drawn atmospheric air into the canister for purging part of the fuel vapors collected in the canister. The part of the fuel vapor is then returned back to the fuel tank.

Usually, a large amount of fuel vapor is generated within the fuel tank during refueling, however, the pressure resistance produced upon opening of the tank pressure-activated valve prevents the fuel vapor from entering the canister smoothly. For this reason, the fuel vapor generated during refueling is fed to the canister through a bypass line extending across the fuel vapor passage which is opened upon opening of a filler cap.

In recent years, a regulation of evaporative emissions produced by a change in temperature during parking of a vehicle has been tightened up for purposes of air pollution control. In order to decrease the amount of fuel vapor evaporated within the fuel tank, it is useful to set a valve opening pressure at which the outlet valve is opened to a higher value to hold the internal pressure of the fuel tank at higher levels, however, it may cause the fuel vapor to escape from the fuel tank if broken upon an accidental collision of the vehicle. Therefore, the valve opening pressure must be restricted to within a range from about 1 kPa to 2 kPa. It is thus difficult to meet the regulation of evaporative emissions.

SUMMARY OF THE INVENTION

It is therefore a principal object of the present invention to avoid the disadvantages of the prior art.

It is another object of the present invention to provide an evaporative emission control system which is designed to decrease the amount of fuel vapor evaporated in a fuel tank for minimizing a discharge of the fuel vapor to the atmosphere.

According to one aspect of the present invention, there is provided an evaporative emission control system which comprises a canister filled with an fuel vapor absorbing substance; an air inlet passage exposed at an end to the atmosphere and connected at the other end to the canister for introducing air into the canister; a fuel vapor passage communicating between the canister and a fuel tank; an outlet valve selectively establishing and blocking communication between the fuel tank and the canister, the outlet valve establishing the communication between the fuel tank and the canister to allow fuel vapor evaporated within the fuel tank to be drawn into the canister through the fuel vapor passage when a pressure in the fuel tank is increased above a first level so that a difference in internal pressure between the fuel tank and the canister reaches a first value; and an inlet valve selectively establishing and blocking communication between the fuel tank and the canister, the inlet valve establishing the communication between the fuel tank and the canister to allow the air to be drawn into the canister through the air inlet passage when the pressure in the fuel tank is decreased below a second level so that a difference in internal pressure between the fuel tank and the canister reaches a second value which prevents the amount of fuel vapor generated within the fuel tank from being increased above a given value.

In the preferred mode of the invention, a bypass line and a bypass line opening means are further provided. The bypass line connects the canister and the fuel tank. The bypass line opening means opens the bypass line to establish communication between the fuel tank and the canister for allowing the air to be drawn into the canister through the air inlet passage before the fuel tank is exposed to the atmosphere upon refueling.

The second value is greater than or equal to 5 kPa.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1A:
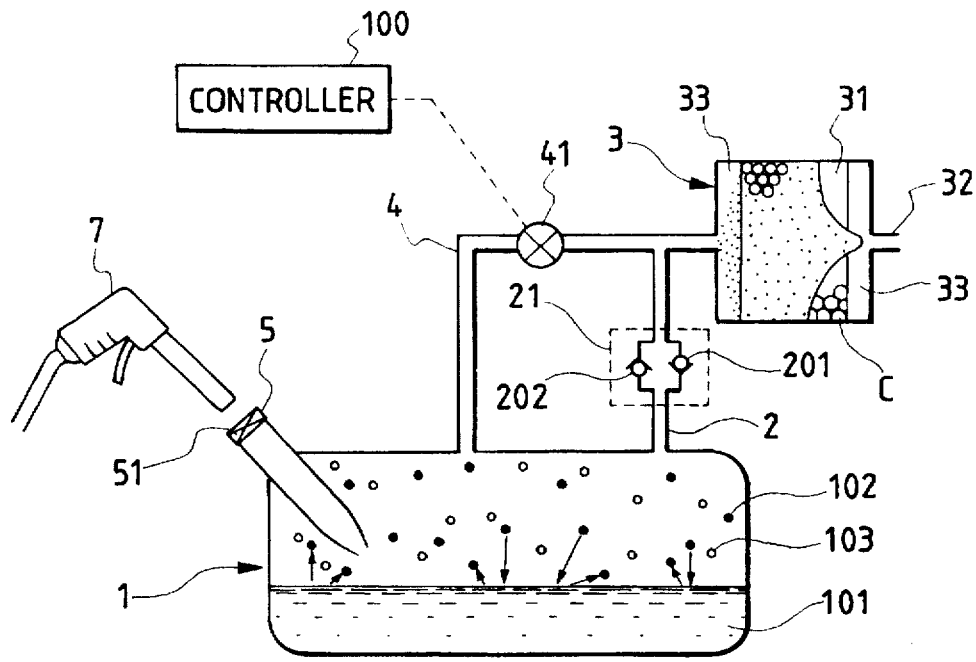
FIG. 1(a) is an illustration which shows an evaporative emission control system according to the present invention.

Referring now to the drawings, particularly to FIG. 1(a), there is shown an evaporative emission control system according to the invention.

The evaporative emission control system includes a fuel vapor collection canister 3, a tank pressure-activated valve 21, a solenoid valve 41, and a controller 100.

The canister 3 is connected through a fuel vapor passage 2 to a fuel tank which stores therein fuel 101. The fuel vapor passage 2 is, as will be discussed later in detail, selectively opened and closed by the tank pressure-activated valve 21.

The canister 3 includes adsorbing layers 31 filled with activated carbon and communicates through an air inlet port with an air inlet passage 32 exposed to the atmosphere. The canister 3 defines therein air layers or chambers 33 upstream and downstream of the absorbing layers 31 for dispersing air and fuel vapor introduced from the air inlet passage 32 and the fuel vapor passage 2 before entering the absorbing layers 31, respectively.

The tank pressure-activated valve 21 includes an outlet valve 201 and an inlet valve 202. The outlet valve 210 is opened when the pressure in the fuel tank 1 is elevated above a given level to develop a difference in internal pressure between the fuel tank 1 and the canister 3 (hereinafter, referred to as an outlet valve opening pressure) greater than a preselected value due to an increase in temperature of the fuel tank 1. The inlet valve 202 is opened when the pressure in the fuel tank 1 drops below a given level (i.e., negative pressure) to develop a difference in internal pressure between the fuel tank 1 and the canister 3 (hereinafter, referred to as an inlet valve opening pressure) greater than a preselected value due to a decrease in temperature of the fuel tank 1.

The outlet valve opening pressure acting on the outlet valve 210 is opened is, for example, 1 kPa to 2 kPa. Thus, when a pressure greater than this outlet valve opening pressure acting on the outlet valve 210, the outlet valve 210 is opened to draw a mixture of fuel vapor 102 and air 103 generated in the fuel tank 1 into the canister 3 through the fuel vapor passage 2 which is, in turn, adsorbed therein. This prevents the pressure in the fuel tank 1 from being elevated undesirably.

The inlet valve opening pressure acting on the inlet valve 202 is set to a value greater than 1 kPa, which is used in conventional evaporative emission control systems, for preventing the fuel vapor passage from being opened immediately when the internal pressure of the fuel tank 1 drops upon decrease in temperature of the fuel tank 1. As the inlet valve opening pressure is increased, the internal pressure of the fuel tank 1 is maintained at lower levels so that the amount of fuel vapor evaporated in the fuel tank 1 is decreased. In this embodiment, the inlet valve opening pressure level is 5 kPa or more, preferably 22 kPa at which the inlet valve 202 is not opened to drawn air into the canister 3 even when the internal pressure of the fuel tank 1 is decreased upon decrease in temperature of the fuel tank 1. This causes the amount of air entering the canister 3 during decrease in temperature of the fuel tank 1 to be decreased to about zero so that the internal pressure of the fuel tank 1 is held at lower levels, thereby decreasing the amount of evaporative emissions.

A bypass line 4, as can be seen in FIG. 1(a), connects a connection of the fuel vapor passage 2 to the canister 3 and the fuel tank 1 through the solenoid valve 41. The solenoid valve 41 is electrically controlled by the controller 100 so as to be opened when a large amount of fuel vapor is generated in the fuel tank 1, for example, upon refueling, for directing the fuel vapor to the canister 3 through the bypass line 4.

Figure 1B:
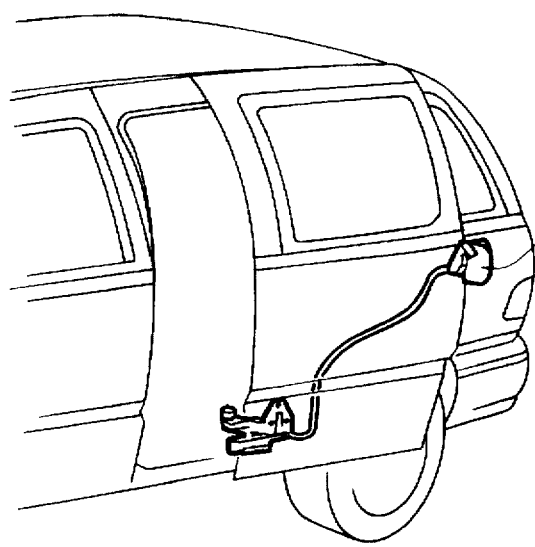
FIG. 1(b) is a partially perspective view which shows a rear fender of a vehicle having disposed therein a filler lid.
Figure 1C:
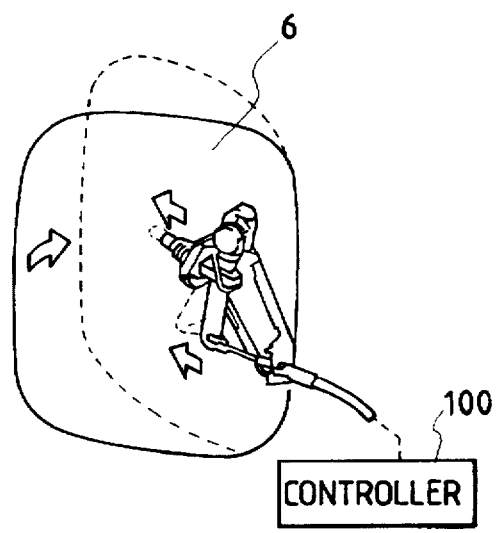
FIG. 1(c) is an expanded view which shows the filler lid in FIG. 2.

Specifically, the solenoid valve 41 is so controlled as to be opened immediately before a filler cap 51 installed on a filler opening 5 of the fuel tank 1 is opened. For instance, the solenoid valve 41 may be controlled by the controller 100 so that it is opened to establish fluid communication between the fuel tank 1 and the canister 3 in synchronization with opening of a fuel lid 6, as shown in FIGS. 1(b) and 1(c), which is usually provided in a rear fender of the vehicle, before the filler cap 51 is opened.

The internal pressure of the fuel tank 1 is low before the filler cap 51 is opened. Thus, upon opening of the solenoid valve 41, a large volume of air is drawn into the canister 3 at high speeds so that a large amount of fuel vapor collected in the canister 3 is purged. This allows the canister 3 to adsorb a large amount of fuel vapor evaporated during refueling.

The decrease in the amount of evaporative emissions achieved by the evaporative emission control system of the present invention will be discussed below.

The DBL (Diurnal Breathing Loss) tests recommended by EPA (Environmental Protection Agency) in the U.S. were performed according to test specifications shown below.

Fuel RVP (Reid Vapor Pressure): 63 kPa (LFG2 recommended by EPA)

Atmospheric pressure: 101.3 kPa

Space volume in a fuel tank: 60l

Ambient temperature is changed from 22.2° C. to 35.6° C. for 24 hours

Figure 2:
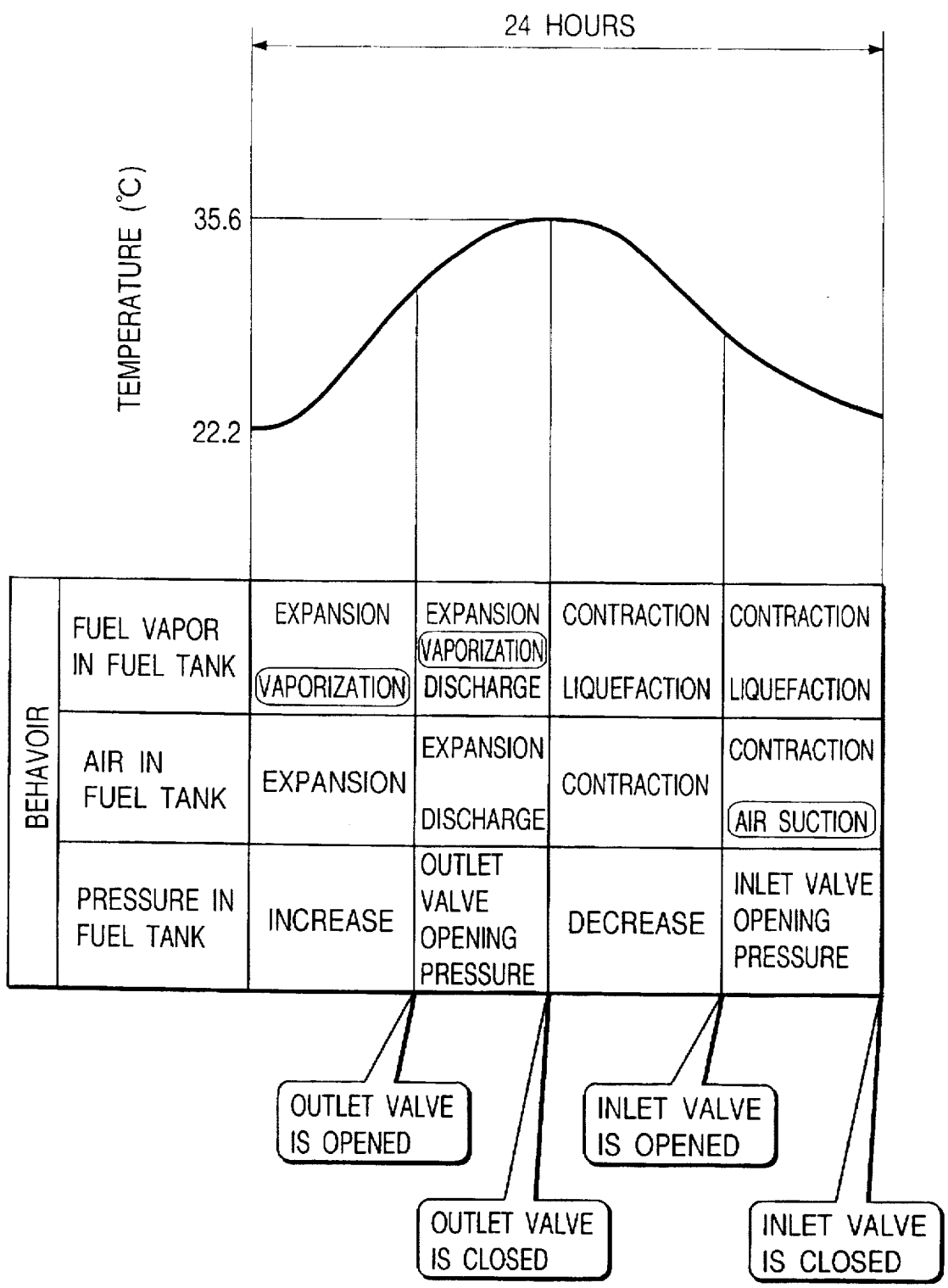
FIG. 2 is a graph which shows the behavior in a fuel tank under the DBL (Diurnal Breathing Loss) test.

FIG. 2 shows the behavior in the fuel tank 1 when the outlet valve opening pressure acting on the outlet valve 210 and the inlet valve opening pressure acting on the inlet valve 202 are 1.5 kPa and 1 kPa, respectively, which are used in conventional evaporative emission control systems. Variations in internal pressure of the fuel tank 1 and vapor concentration during the DBL test are shown by broken lines in FIG. 3.

Figure 3:
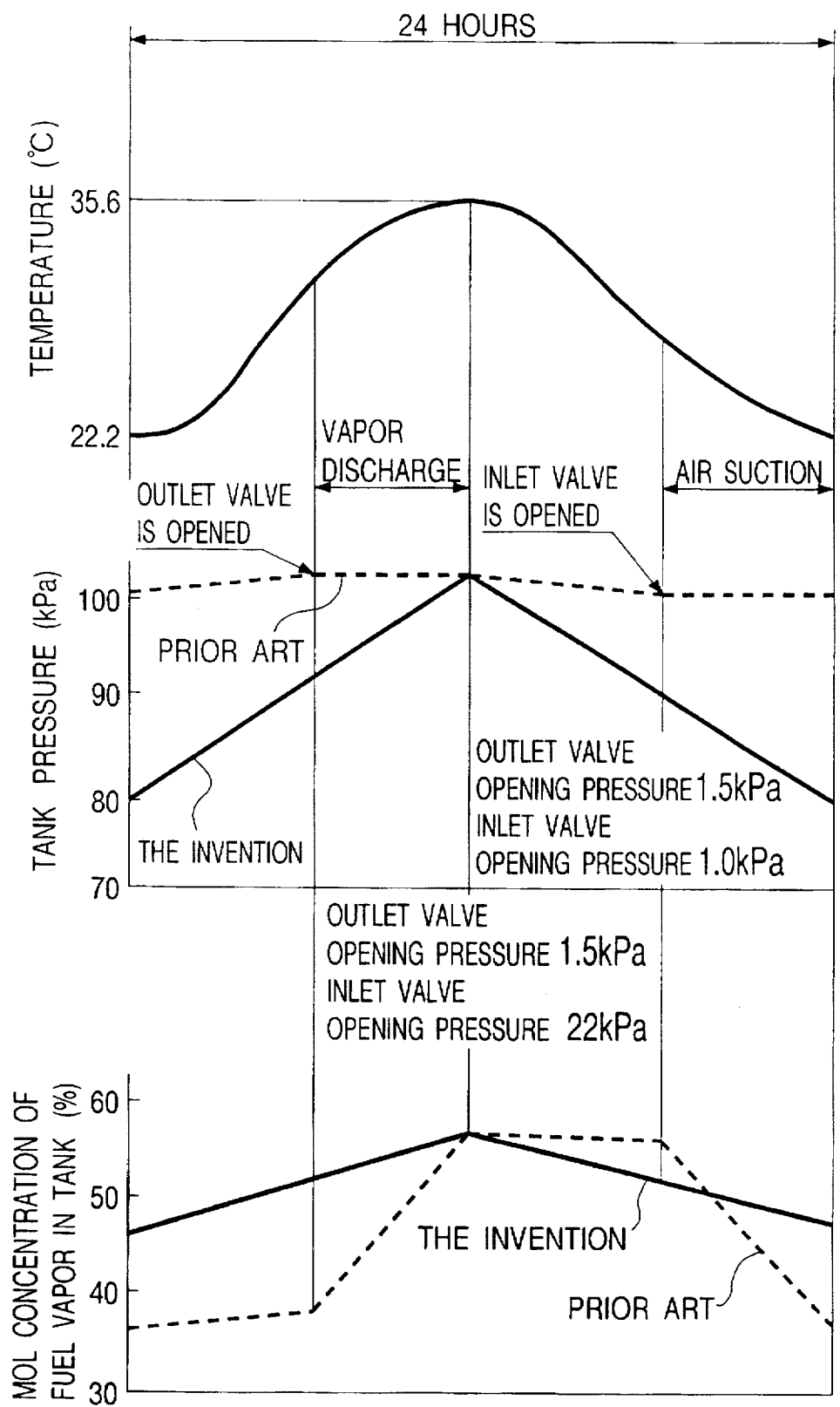
FIG. 3 is a graph which shows variations in temperature, internal pressure of a fuel tank, and the amount of fuel vapor generated within the fuel tank under the DBL test.

As can be seen from FIGS. 2 and 3, the elevation in ambient temperature causes the fuel 101 in the fuel tank 1 to be vaporized and expanded and the air 103 to be expanded to increase the internal pressure of the fuel tank 1. When the internal pressure of the fuel tank 1 exceeds a given level so that a difference in internal pressure between the fuel tank 1 and the canister 3 reaches the outlet valve opening pressure, the outlet valve 201 is opened to discharge a mixture of the fuel vapor 102 and the air 103 from the fuel tank 1 to the canister 3. When the elevation in ambient temperature is stopped, the outlet valve 201 is closed.

When the ambient temperature is decreased, it will cause the fuel vapor to be contracted and liquefied so that the internal pressure of the fuel tank 1 drops. When the internal pressure of the fuel tank 1 drops below a given level so that a difference in internal pressure between the fuel tank 1 and the canister 3 reaches the inlet valve opening pressure, the inlet valve 202 is opened to draw air into the canister 3 through the air inlet passage 32. When the decrease in ambient temperature is stopped, it will cause the inlet valve 202 is closed.

Figure 4:
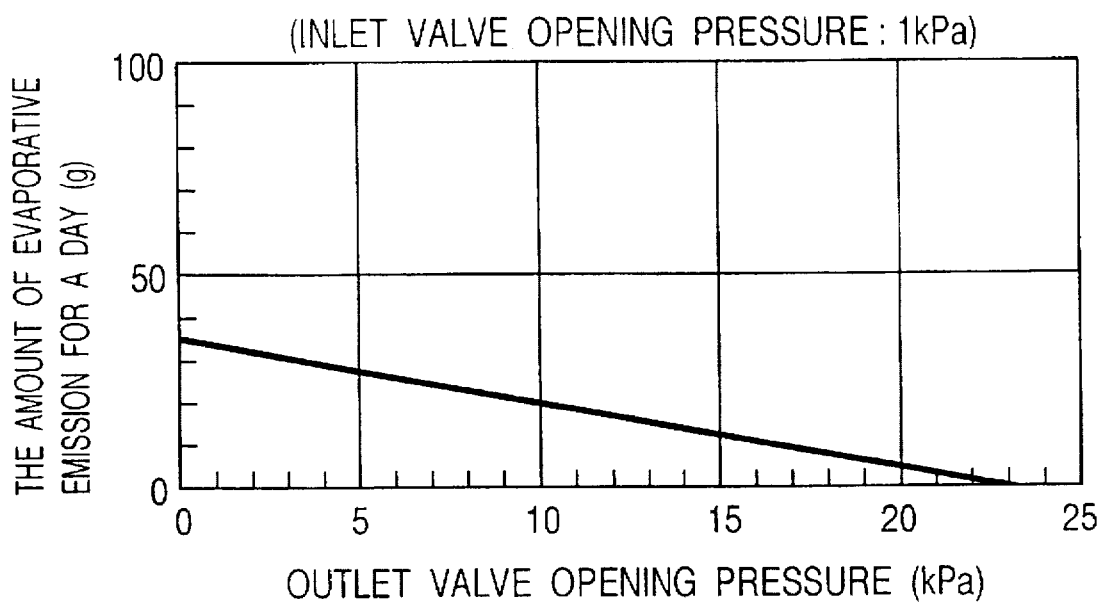
FIG. 4 is a graph which shows the relation between the amount of evaporative emissions for a day and a valve opening pressure of an outlet valve when a valve opening pressure of an inlet valve is set to 1 kPa.

If the outlet valve opening pressure is set to a higher value, it will cause the internal pressure of the fuel tank 1 to be held at a higher level, thereby restricting the fuel 101 from being vaporized so that the amount of fuel vapor to be generated in the fuel tank 1 is decreased. Specifically, as the outlet valve opening pressure level is increased, the amount of evaporative emissions (i.e., a total amount of evaporative emissions discharged from the fuel tank 1 to the canister 3 for 24 hours under the DBL test) is, as shown in FIG. 4, decreased, but a difficulty is encountered in regard to safety, as discussed above.

Figure 5:
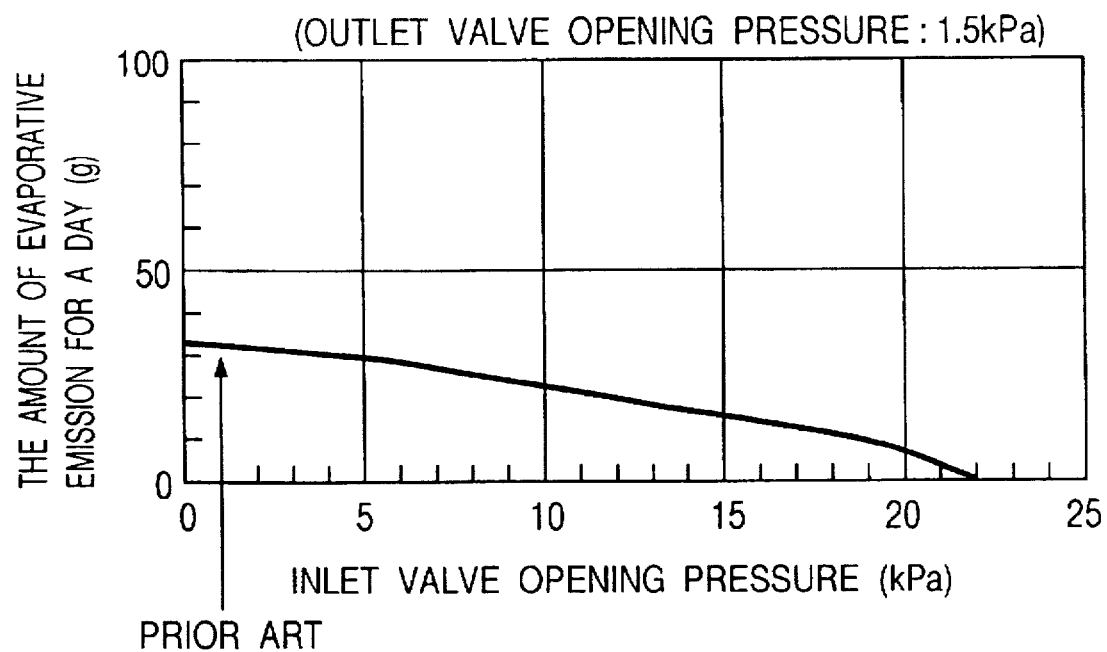
FIG. 5 is a graph which shows the relation between the amount of evaporative emissions for a day and a valve opening pressure of an inlet valve when a valve opening pressure of an outlet valve is set to 1.5 kPa.

In the evaporative emission control system of this invention, the outlet valve opening pressure acting on the outlet valve 201 is the same as that used in the conventional evaporative emission control systems, but the inlet valve opening pressure acting on the inlet valve 202 is set to a higher value, as described above. Variations in internal pressure of the fuel tank 1 and vapor concentration are shown by solid line in FIG. 3. The volume of air entering the caster 3 during decrease in ambient temperature becomes zero so that the internal pressure of the fuel tank 1 is held at lower levels. This reduces the expansion of the air 103 in the fuel tank 1 during subsequent increase in ambient temperature greatly, thereby restricting the generation of fuel vapor. Specifically, a change in ambient temperature causes the air 103 and the fuel vapor 102 within the fuel tank 1 to be vaporized (i.e., expanded) or contracted, but they are insulated from the outside completely so that the amount of evaporative emissions (i.e., a total amount of evaporative emissions for 24 hours under the DBL test) is, as shown in FIG. 5, decreased to zero.

While in this embodiment, the inlet valve opening pressure is set to 22 kPa at which the amount of evaporative emissions becomes zero, it is not limited to this pressure value. It is advisable that the inlet valve opening pressure be determined based on a desired amount of evaporative emissions and a withstanding negative pressure of the fuel tank 1 since the amount of evaporative emissions is, as shown in FIG. 5, decreased as the inlet valve opening pressure is increased.

Next, the opening timing control of the bypass line 4 will be discussed below.

When the inlet valve opening pressure acting on the inlet valve 202 is set to 22 kPa, the internal pressure of the fuel tank 1 is, as shown in FIG. 3, maintained low. Under this condition, when the solenoid valve 41 is turned on in synchronization with opening of the fuel lid 6 before the filler cap 51 is opened, it will cause the bypass line 4 to be exposed to the atmosphere through the canister 3 so that a large volume of fresh air is drawn into the caster 3, thereby purging a large amount of fuel vapor captured in the caster 3.

Subsequently, when the filler cap 51 is opened completely, and fuel is then supplied by a finer gun 7 from the filler opening 5, fuel vapor generated within the fuel tank 1 is drawn into the caster 3 through the bypass line 4 and then captured in the canister 3 which has already been purged of the adsorbed fuel vapor before refueling. This also checks deterioration of the absorbing substance. Additionally, air is not drawn into the fuel tank 1 through the filler opening 5 since the bypass line 4 has already been opened in synchronization with the opening of the fuel lid 8 before the filler cap 51 is opened, thereby preventing noise and frictional heat from being generated which are usually caused by high speed air flow from the filler opening 5.

Figure 6:
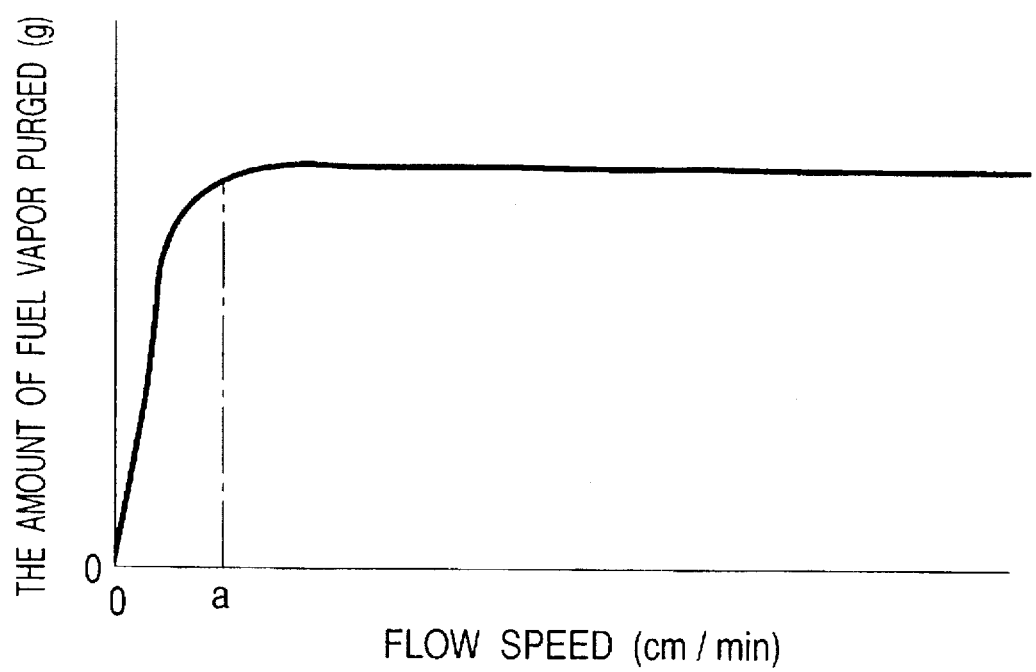
FIG. 6 is a graph which shows the relation between the amount of fuel vapor purged by a canister and a flow rate of air drawn into the canister.
Figure 7:
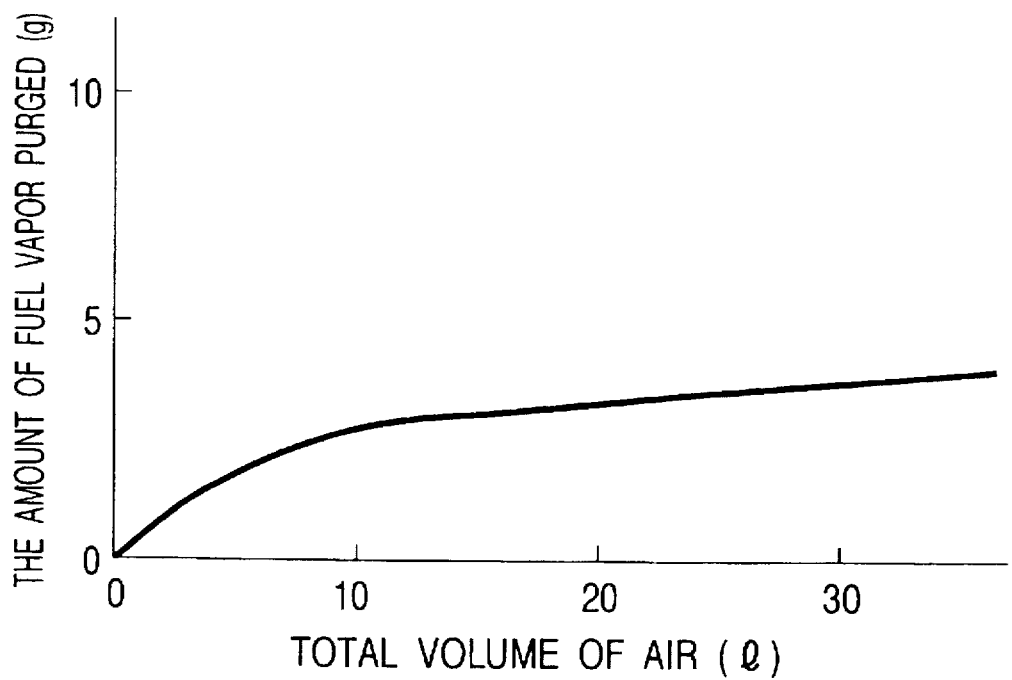
FIG. 7 is a graph which shows the relation between the amount of fuel vapor purged by a canister and a total volume of air drawn into the canister.

FIG. 6 shows the relation between the flow speed of air drawn into the canister 3 and the mount of fuel vapor the canister can purge (hereinafter, referred to as the purged vapor amount). As apparent from the drawing, the purged vapor amount reaches an upper hit at a flow speed of $\underline{a}$. Note that the flow speed of air entering the canister 8 will exceeds the flow speed of $\underline{a}$ since from FIG. 3, a minimum value of the internal pressure of the fuel tank 1 is 79 kPa. FIG. 7 shows the relation between a total volume of air entering the canister 3 and the purged vapor amount. The total volume of air entering a canister of a conventional system reaches about 1 lit. when the volume of a fuel tank is 80 lit., while the total volume of air in this system reaches as much as about 16 lit. This allows more fuel vapor to be purged by the canister 3.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An evaporative emission control system comprising:

a canister filled with a fuel vapor absorbing substance;

an air inlet passage exposed at an end to the atmosphere and connected at another end to said canister for introducing air into said canister;

a fuel vapor passage communicating between said canister and a fuel tank;

an outlet valve selectively establishing and blocking communication between the fuel tank and said canister through said fuel vapor passage, said outlet valve establishing the communication between the fuel tank and said canister to allow fuel vapor evaporated within the fuel tank to be dram into said canister through said fuel vapor passage when a pressure in the fuel tank increases above a first level so that a difference in internal pressure between the fuel tank and said canister reaches a first value;

an inlet valve selectively establishing and blocking communication between the fuel tank and said canister through said fuel vapor passage, said inlet valve establishing the communication between the fuel tank and said canister to allow the air to be drawn into said canister through said air inlet passage when the pressure in the fuel tank decreases below a second level so that a difference in internal pressure between the fuel tank and said canister reaches a second value which prevents the amount of fuel vapor generated within the fuel tank from being increased above a given value;

a bypass line bypassing said fuel vapor passage, connecting said canister and the fuel tank; and bypass line opening means for opening said bypass line to establish communication between the fuel tank and said canister for allowing the air to be drawn into said canister through said air inlet passage before the fuel tank is exposed to the atmosphere upon refueling.

2. An evaporative emission control as set forth in claim 1, wherein the second value corresponds to a preselected pressure level greater than the atmosphere.

3. An evaporative emission control as set forth in claim 2, wherein the preselected pressure is 22 kPa.

4. An evaporative emission control as set forth in claim 1, wherein the second value is so determined as to prevent said inlet valve from being opened to establish the communication between the fuel tank and said canister immediately when the pressure in the fuel tank and said canister immediately when the pressure in the fuel tank becomes a negative pressure upon decrease in temperature within the fuel tank.

5. An evaporative emission control as set forth in claim 1, wherein the second value is so determined as to open said inlet valve to establish the communication between the fuel tank and said canister when the internal pressure of the fuel tank is lowered over a given range less than or equal to the atmosphere.

* * * * *